United States Patent [19]

Havalda

[11] 4,127,487
[45] Nov. 28, 1978

[54] FILTRATION SYSTEM

[75] Inventor: Paul Havalda, Arlesheim, Switzerland

[73] Assignee: Ciba-Geigy Corporation, Ardsley, N.Y.

[21] Appl. No.: 838,282

[22] Filed: Sep. 30, 1977

[30] Foreign Application Priority Data

Oct. 5, 1976 [CH] Switzerland ............... 12579/76

[51] Int. Cl.² ............................................. B01D 33/32
[52] U.S. Cl. ..................................... 210/350; 210/68; 210/401; 210/402
[58] Field of Search ................ 210/77, 160, 297, 400, 210/401, 258, 66, 67, 68, 350, 351; 162/312, 213; 100/118–120, 151–154, 211

[56] References Cited

U.S. PATENT DOCUMENTS

| 2,730,933 | 1/1956 | Reynolds | 162/213 |
| 3,870,641 | 3/1975 | Pierson | 210/400 |
| 3,872,695 | 3/1975 | Busek | 100/118 |

FOREIGN PATENT DOCUMENTS 346,426  3/1971  U.S.S.R. ................................ 162/312

Primary Examiner—Frank Sever
Attorney, Agent, or Firm—Harry Falber

[57] ABSTRACT

A filtration system having an intermittently moving belt on which is deposited a suspension to form a filter cake. A press is provided above the belt comprising one or more pressure cushions, and suction chambers are disposed below the belt. A control system coupled to the cushions and the chambers controls application of pressure to the former and suction to the latter to press the cushions down on the filter cake formed on the belt and to draw off moisture from the compressed cake, the action of applying pressure and suction halting movement of the belt. After filtering the cake the pressure and suction are removed allowing the belt to move forward and another filtration cycle to start on the next section of the filter cake formed on the belt.

13 Claims, 4 Drawing Figures

FILTRATION SYSTEM

FIELD OF INVENTION

This invention relates to a filtration system.

PRIOR ART

Filter cakes formed on the belt of filtration systems frequently have excessive residual moisture and must therefore be dried. For example, the residual moisture content of dye filter cakes formed on vacuum belt filtration systems is still often in the region of 70 to 85%. This is due mainly to cracking of the filter cake which occurs during filtration when moisture is removed by suction. Often the filter cake is subsequently dried in special drying systems which are separate from the filtration system. Such separate drying systems are expensive and need additional floor space.

OBJECT OF THE INVENTION

It is an object of this invention to provide an inexpensive filtration plant in which there is no need for subsequent drying of the filter cake.

SUMMARY OF THE INVENTION

The invention provides a filtration system having a filter belt which is driven intermittently, suction means disposed beneath a section of the belt, and a control system which actuates the suction means when the belt is stationary. The system also includes a press having at least one gas-permeable pressure cushion which is movable towards and away from the filter belt opposite the region at which the suction means is disposed, and has adjusting means synchronized with the filter belt drive for pressing the cushion against the cake on the filter belt at least during part of the period during which the belt is stationary.

By pressing the cake against the filter belt cracking is prevented and the cavity volume or porosity and pore size of the filter cake are reduced, since a large proportion of the liquid is removed by the pressing operation. The gas-permeable construction of the pressure cushion enables gas or air to be applied to the filter cake surface during the pressing operation and thus enables pressing and suction to be carried out simultaneously. Pressing again provides optimum conditions for suction, since a kind of piston flow develops in the relatively small-pored filter cake layer, which, as a result of the pressing operation, is free from cracks. As the pore suction operation progresses, the speed of the gas or air flow sucked through the filter cake increases which results in the film of liquid adhering to the pore or cell walls being entrained in the flow. Thus the residual moisture content of filter cakes produced with a system according to this invention is much lower than some previously known systems (first pilot tests show residual moisture reduction of about 10 to 30%) so that there is no need for subsequent drying of the filter cake. Another advantage of pressing the cake against the belt is that the case can be removed from the filter belt much more easily and with practically no residues remaining on the belt. This improves economy and reduces the effluent.

BRIEF DESCRIPTION OF THE DRAWINGS

A preferred embodiment of the invention will be explained in detail hereinafter with reference to the accompanying drawings wherein.

DETAILED DESCRIPTION OF PREFERRED EMBODIMENT

Figure 1:
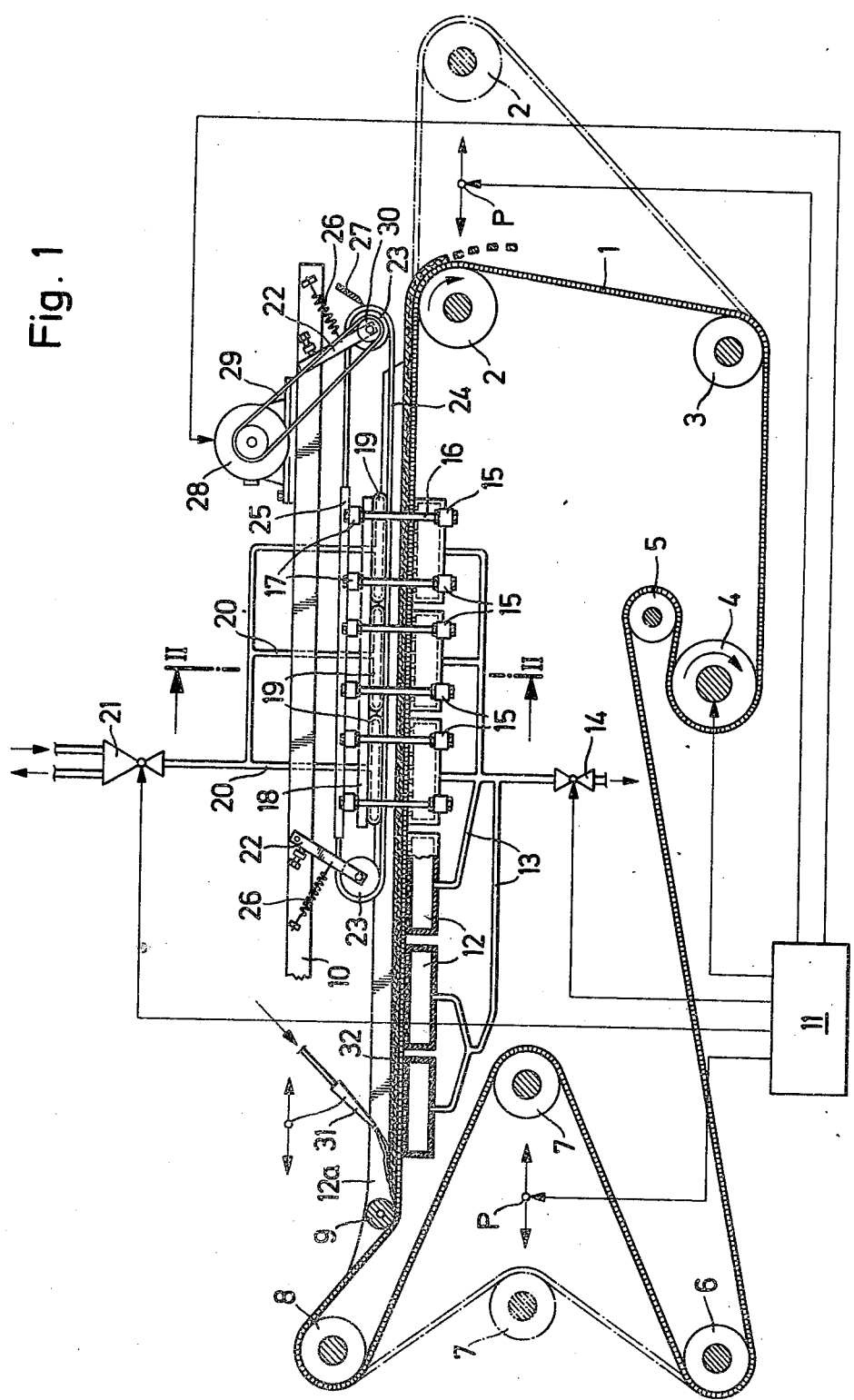
FIG. 1 is a diagram showing a filter system according to the invention.

Except for the press, the belt filtration system shown in FIG. 1 is similar to that described in U.S. Pat. No. 3,870,641. The system comprises an endless filter belt 1 trained over rollers 2 to 9. Except for roller 9, which is constructed as a cloth-forming rod, the rollers are mounted rotatably in a machine frame, of which, for the sake of simplicity, only a rail 10 is shown. Roller 4 is driven by a drive motor (not shown). Rollers 2 and 7 are adjustable in the direction of the arrows P by a pneumatic cylinder (not shown). A control means 11 controls the drive for the roller 4 and the adjustment of the rollers 2 and 7 in such a manner that the top horizontal section of the filter belt advances intermittantly by a specific increment. The exact sequence of operations of the filter belt drive is described in detail in the above-mentioned U.S. Pat. No. 3,870,641.

Figure 2:
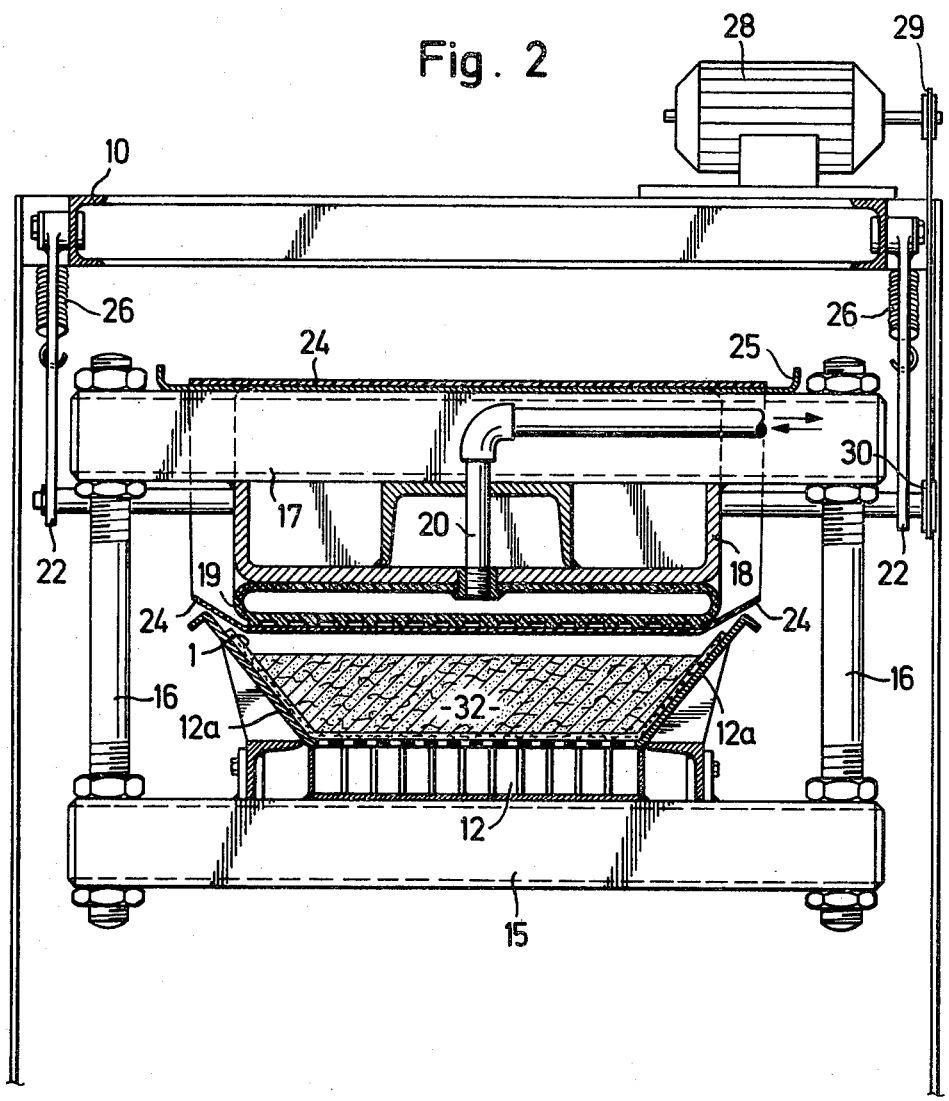
FIG. 2 is a detailed section on the line II—II of FIG. 1.

Beneath the horizontal section of the filter belt situated between the rollers 9 and 2 there is disposed a row of vacuum chambers 12, connected to a vacuum or suction source (not shown) via lines 13 and a valve 14 which is also controlled by the control means 11. The chambers 12 are evacuated, or suction applied only when the top run of the filter belt 1 is stationary, and this is also described in U.S. Pat. No. 3,870,641. During forward movement of the top run of the belt the chambers 12 are connected to atmosphere. In the zone between the rollers 9 and 2 the filter belt runs in a channel 12a (FIG. 2).

Bottom cross members 15 are fixed on the undersides of the vacuum chambers 12 and extend transversely to the longitudinal direction of the filter belt 1 and project laterally beyond the belt and vacuum chambers 12. At their ends, the cross members 15 each support an upright 16 which projects beyond the level of the filter belt 1, the uprights in turn being connected by top cross members 17. The top and bottom cross members and the uprights form the frame for the above mentioned press and enclose the filter belt in a tunnel (FIG. 2). An elongate support member 18 having a planar horizontal underside is fixed to the lower surface of the top cross members 17. Three pressure cushions 19, the undersides of which are textured (FIG. 2) are fixed on the member 18. The cushions 19 are connected via lines 20 and a valve 21 to a pressure source and to a vacuum source (not shown). Valves 21 and 14 are actuated automatically by the control means 11 to apply gas or air to the pressure cushions 19 and to evacuate or apply suction to the chambers 12 to halt the top run of the filter belt, the pressure cushions being evacuated or connected to atmosphere when the vacuum chambers are vented to allow the filter belt to move forward. The control means 11 may be any desired control circuit providing the sequence of functions and movements described here and below. The practical embodiment of such a control system is within the knowledge of those versed in the art and does not therefore need to be explained in detail here.

A pair of pivoted arms 22 are mounted at the front and rear ends of the press frame on rails 10 extending above the filter belt 1 and a roller 23 is rotatably mounted between each arm of a pair. An endless belt 24 of material permeable to air or gas is trained around the rollers 23 and tensioned by tension springs 26 coupled to the arms 22.

The top run of the belt 24 travels in a guide channel 25 mounted on the top of the cross members 17, while the bottom run bears against the pressure cushions 19 and covers the latter over their entire width. The air-permeable belt 24 is driven by a drive motor 28 via one of the two rollers 23. The motor 28 and the roller 23 are connected via a V-belt 29 and a belt pulley 30 journalled on the roller spindle so as to rotate therewith. Motor 28 is controlled by the control system 11 so as to advance the air-permeable belt 24 by an amount corresponding approximately to the total length of the press when there is no pressure applied to the cushions 19 and then stop. During advance of the belt 24, cleaning means, in the form of a scraper 27 removes any filter cake residues adhering to the belt 24.

The above-described filter system operates as follows: A suspension to be filtered is applied to the top run of the filter belt 1 by means of a movable distributor nozzle 31 located near the roller 9, and is distributed substantially uniformly over the top surface of the belt 1. Pressure is applied to the pressure cushions 19 and the chambers 12 are evacuated or suction applied thereto in response to a signal from the control system. As a result of the application of suction to the chambers 12 and pressure to the pressure cushions 19 pressing them down onto the filter cake 32, the top run of the filter belt 1 is halted and the rollers 2 and 7 move out of their positions of rest (shown in dotted lines in FIG. 1) in the manner described in U.S. Pat. No. 3,870,641. When the rollers have reached their end positions, the vacuum chambers 12 and the pressure cushions 19 are vented to atmosphere. As a result, the top run of the filter belt 1 is released and advanced by a predetermined distance. The gas-permeable belt 24 is advanced simultaneously whereupon a new filtration cycle can start.

Figure 3:
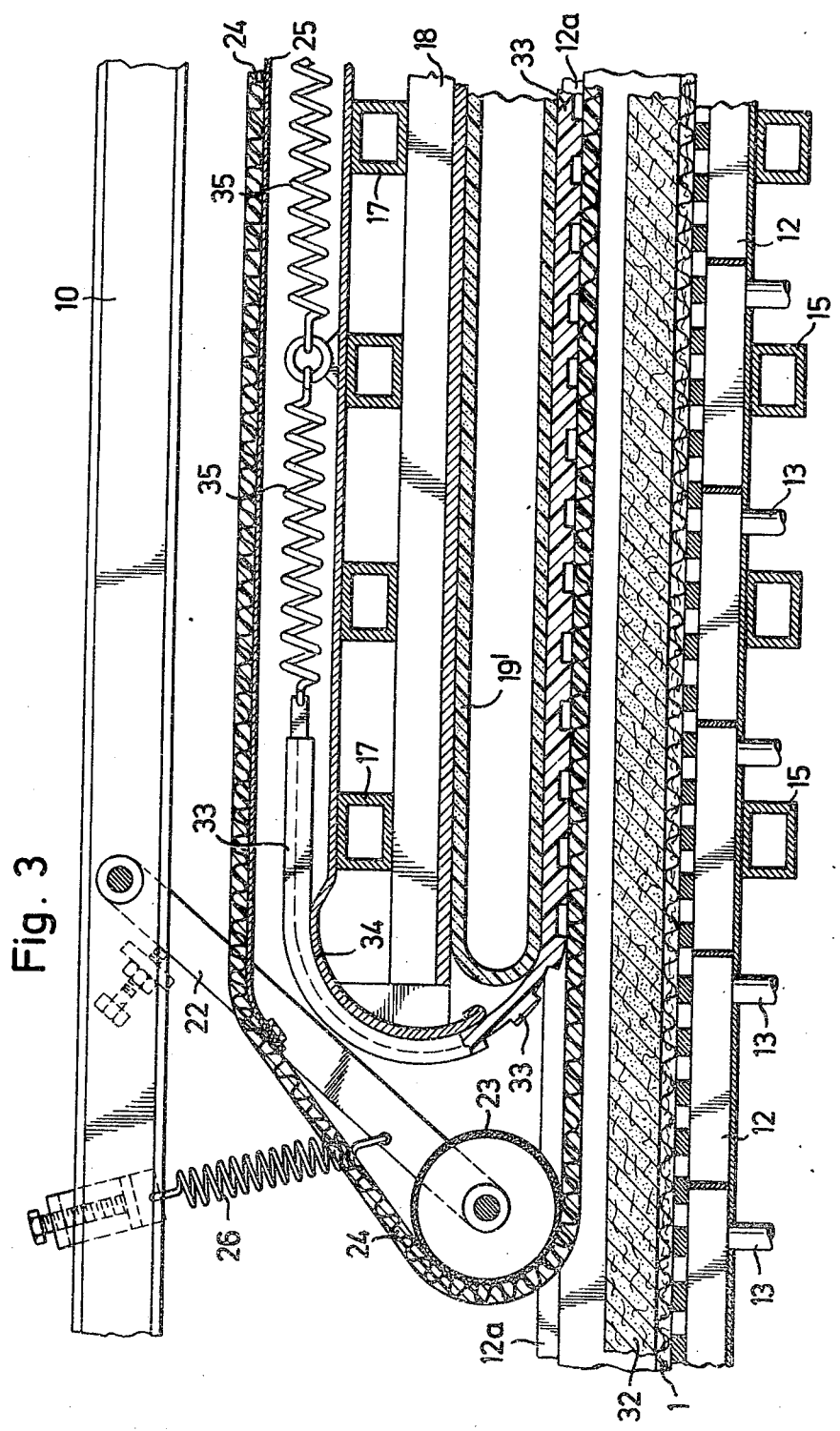
FIG. 3 is a section on the line III—III of FIG. 4 showing a modification of the system shown in FIGS. 1 and 2.
Figure 4:
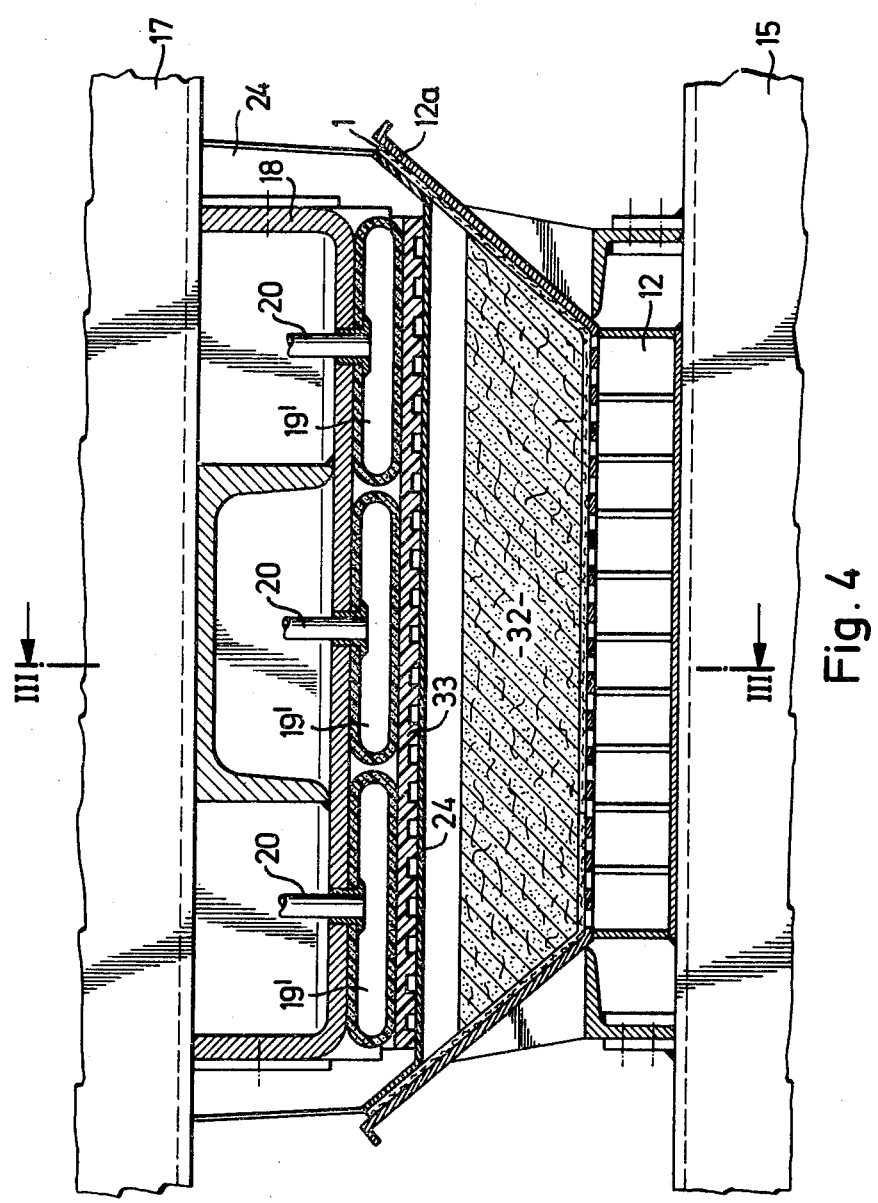
FIG. 4 shows the modification in a sectional view similar to that shown in FIG. 2.

As will be seen from FIG. 2, the underside of the pressure cushions 19 facing the filter cake is fluted or grooved so that air has access to the entire filter cake surface even during pressing so that drying is not hindered. Instead of the pressure cushions 19 being textured, a textured corrosion protection belt 33 may be provided as shown in FIGS. 3 and 4. Each pressure cushion 19 may have its own belt 33 or, as shown in the drawing (FIG. 4), a belt 33 may be provided common to all the pressure cushions 19, which in FIG. 4 are shown as each occupying a third of the total width of the support member 18. The belt 33 is trained over guide plates 34 fixed on the support member 18 and on the top cross members 17, and is tensioned by tension springs 35. The depth of the texturing is preferably 2 to 10 mm. The remainder of the construction of the modified press shown in FIGS. 3 and 4 corresponds to that shown FIGS. 1 and 2 and like parts have like references.

The advantage of the construction shown in FIGS. 3 and 4 is that material best adapted to specific elasticity requirements and, in particular, commercially available pressure pads without texturing, can be used for the pressure cushion or cushions 19. Any corrosion problems can also be solved in the best way by appropriate selection of the protective belt material without special regard for its elasticity. Elastomeric material may be used for the pressure cushions and hard-elastic material for the protective belt. Nylon fabric coated with synthetic rubber on both sides has proved very suitable, for example, as material for the pressure cushions. Suitable pressure cushions are available commercially, under the name PRONAL. The material or surface properties of the faces of the pressure cushions and the surfaces of the belt 24, are chosen to have adequate sliding properties. Plastics, more particularly propylene, polyester or polyamide, have proved suitable as material for the air-permeable belt 24. The protective belt 33 is preferably made from rubber, polytetrafluorethylene or the like.

The gas-permeable belt 24 which is non-textured in the embodiment described above may be textured on its inner surface. This would allow the use of commercially available pressure cushions 19 with non-textured faces and a protective non-textured belt 33.

A filtration system according to the invention is also particularly suitable for use with a preceding suspension system for the filter cake as described, for example, in DOS Nos. 25 15 740 and 26 20 627. The combination of flowing a suspension on a filter belt and then applying large-area compaction as described above has provided particularly advantageous in pilot tests for producing high-quality filter cakes and has given the following advantages:

Amount of washing liquid reduced to up to 50%

More thorough washing out of the filter cake (inter alia neutral reaction of the cake even after drying).

Reduction of residual moisture content by 10 to 30%.

Reduction of the volume of filter cake (bulk density increased by about 25%)

Better detachment of cake from the filter cloth surface so that the cake losses in cloth washing water are reduced.

Cake prevented from cracking, thus resulting in uniform cake drying.

Shorter washing zone (reduced by about 1.5 to 2 times).

Possibility of treating thicker cake layers.

What is claimed is:

1. A filtration system for filtering cake formed on a travelling belt comprising a filter belt, means for driving the belt intermittantly, suction means disposed beneath the belt, a press having at least one horizontally stationary, substantially uniformly gas-permeable pressure cushion of a resilient material of construction, means for moving said cushion towards and away from the filter belt in the region of the suction means, and control means actuating said suction means to apply suction to the cake formed on said belt and actuate said press to press the cushion against cake formed on the filter belt, to halt the belt; said cushion functioning to simultaneously press and substantially uniformly permeate gas through said cake.

2. A system according to claim 1 wherein said at least one cushion has a face covered with an open structure of a depth between 2 to 10mm, said system further including a gas-permeable layer in contact with the open structure of the cushion face.

3. A system according to claim 2 wherein the gas-permeable layer is formed by an endless gas-permeable belt.

4. A system according to claim 3 wherein said press includes a plurality of cushions and said gas-permeable belt is common to all said cushions.

5. A system according to claim 3 including rollers about which said belt is trained, and means for tensioning one of the rollers guiding the gas-permeable belt.

6. A system according to claim 3, including cleaning means for the endless gas-permeable belt, and a drive for moving the belt intermittantly past the cleaning means.

7. A system according to claim 1 wherein said at least one cushion has a face covered by a layer of corrosion-resistant material, the surface of which facing the filter belt has an open structure of a depth between 2 to 10 mm, said system further including a gas-permeable layer in contact with the open structure of said cushion face.

8. A system according to claim 7 wherein the gas-permeable layer is formed by an endless gas-permeable belt.

9. A system according to claim 8 including rollers about which said belt is trained, and means for tensioning one of the rollers guiding the gas-permeable belt.

10. A system according to claim 7 wherein the corrosion-resistant layer is formed by a protective belt.

11. A system according to claim 1 wherein said press includes a plurality of cushions and said system further includes a protective belt common to all said cushions.

12. A system according to claim 1 including means for applying pressure to said at least one cushion and wherein each cushion is formed by at least one pressure pad of substantially three-diamensionally rectangular shape.

13. A system according to claim 12 including means for evacuating the cushions.

* * * * *